United States Patent
Bennett

(10) Patent No.: US 6,772,924 B2
(45) Date of Patent: Aug. 10, 2004

(54) STRINGER USABLE FOR SMALL, MEDIUM AND LARGE FISH

(76) Inventor: Colin W. Bennett, 293 Kenilworth Avenue North, Hamilton, Ontario (CA), L8H 4S8

( * ) Notice: Subject to any disclaimer, the term of this patent is extended or adjusted under 35 U.S.C. 154(b) by 0 days.

(21) Appl. No.: 10/058,699

(22) Filed: Jan. 30, 2002

(65) Prior Publication Data
US 2003/0141326 A1 Jul. 31, 2003

(51) Int. Cl.[7] .............................................. A01K 65/00
(52) U.S. Cl. ................................. 224/103; 43/55
(58) Field of Search ............................... 224/103; 43/55

(56) References Cited

U.S. PATENT DOCUMENTS

| | | | | |
|---|---|---|---|---|
| 928,427 A | * | 7/1909 | Coleman | 224/103 |
| 1,350,390 A | * | 8/1920 | Stein | 224/103 |
| 1,417,759 A | * | 5/1922 | McNiece | 224/103 |
| 2,424,658 A | * | 7/1947 | Hanson | 224/103 |
| 2,536,531 A | * | 1/1951 | Bishop | 224/103 |
| 2,734,671 A | * | 2/1956 | Adams | 224/103 |
| 2,760,700 A | * | 8/1956 | Lien | 224/103 |
| 3,371,830 A | * | 3/1968 | Parkman | 224/103 |
| 3,387,753 A | * | 6/1968 | Bowman | 224/103 |
| 4,308,643 A | * | 1/1982 | Montplaisir | 24/132 R |
| 4,313,549 A | * | 2/1982 | Nelson | 224/103 |
| 4,327,850 A | * | 5/1982 | Robinson, Jr. | 224/103 |
| 4,570,836 A | * | 2/1986 | Mayo | 224/103 |
| 4,827,661 A | * | 5/1989 | Wendler | 43/55 |
| 4,960,231 A | * | 10/1990 | Popovich | 224/103 |
| 5,031,809 A | * | 7/1991 | Roberts et al. | 224/103 |
| 5,467,908 A | * | 11/1995 | Cote | 224/103 |
| 5,482,195 A | * | 1/1996 | Hobbs | 224/103 |

* cited by examiner

Primary Examiner—Nathan J. Newhouse

(57) ABSTRACT

A stringer for small, medium sized and large fish which includes a cotton stringer rope about twelve feet long. One end of the rope is secured to the fisherman's boat and the stringer tossed overboard. The end of the stringer in the water is securely joined to a small ring forming the upper end of a braided steel wire about eight inches long. A small ring also forms the lower end of the steel wire. A stainless steel pin connects the middle of a U shaped channel having two small holes near its opposite edges to the small ring forming the lower end of the steel wire. The pin is secured in place by a stainless steel rivet on each end of the pin.

4 Claims, 4 Drawing Sheets

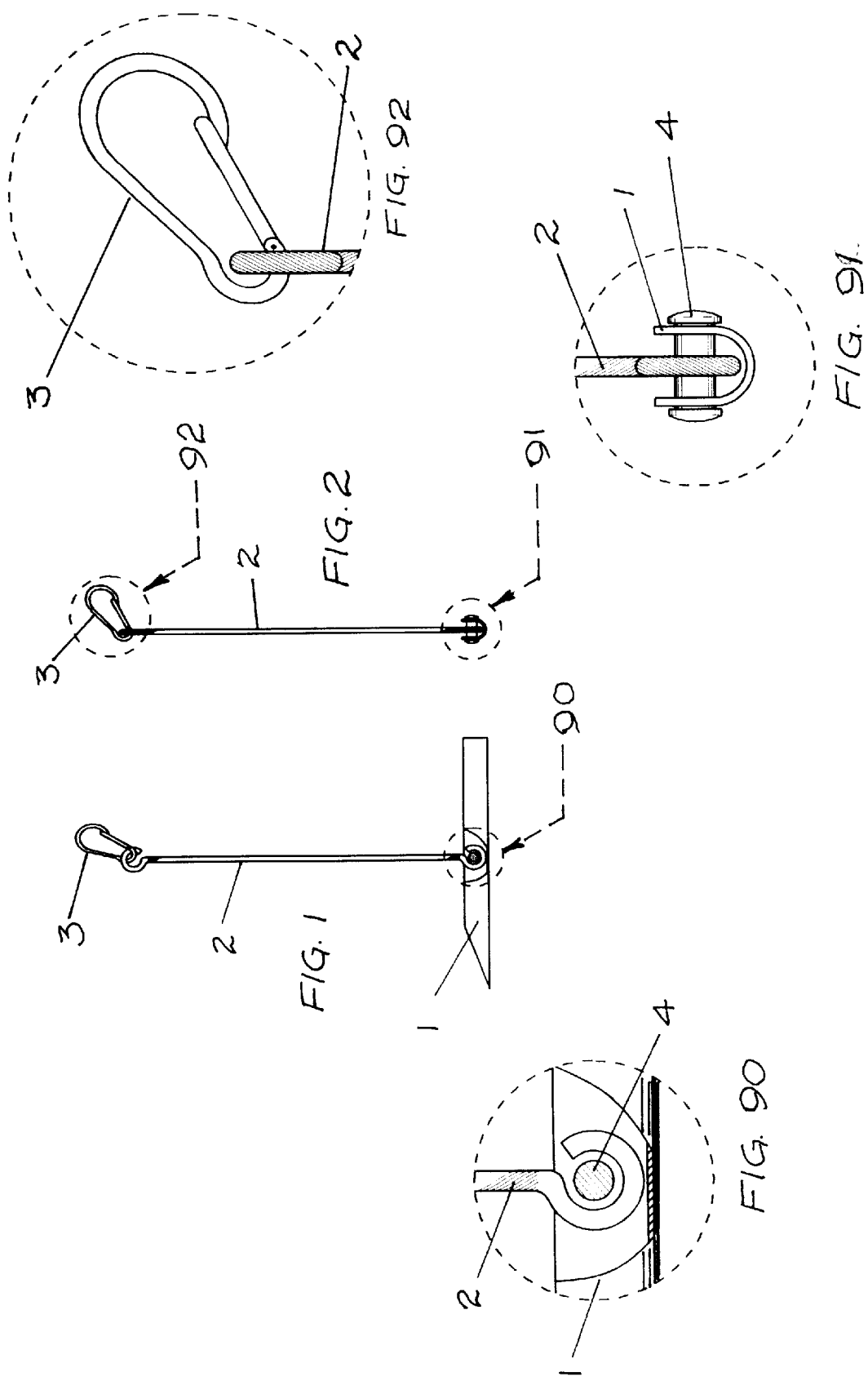

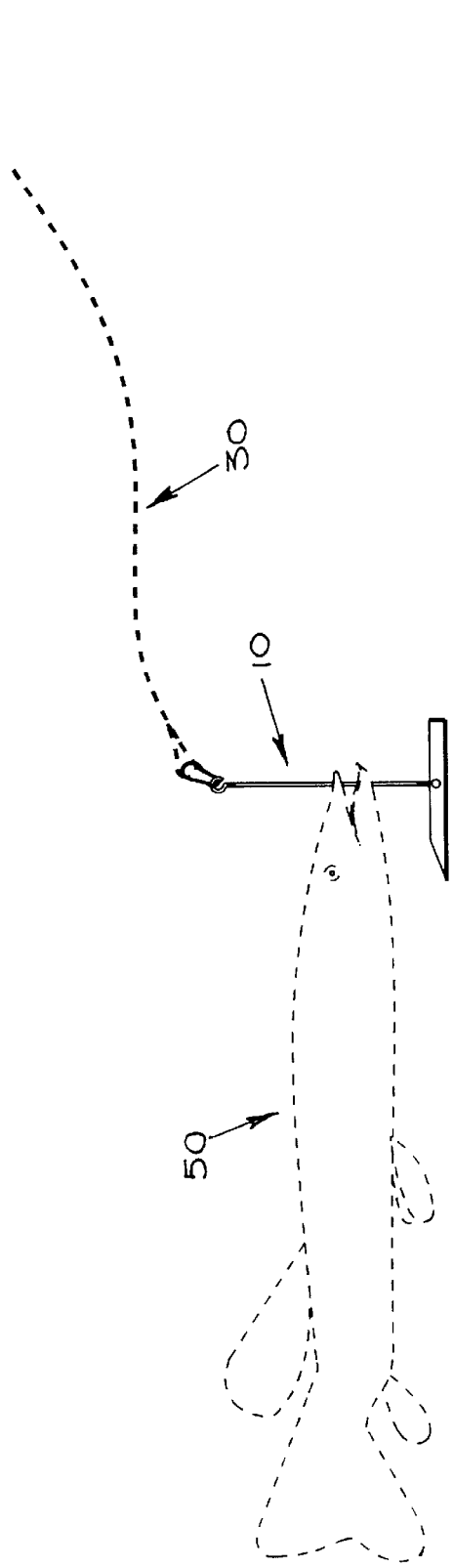
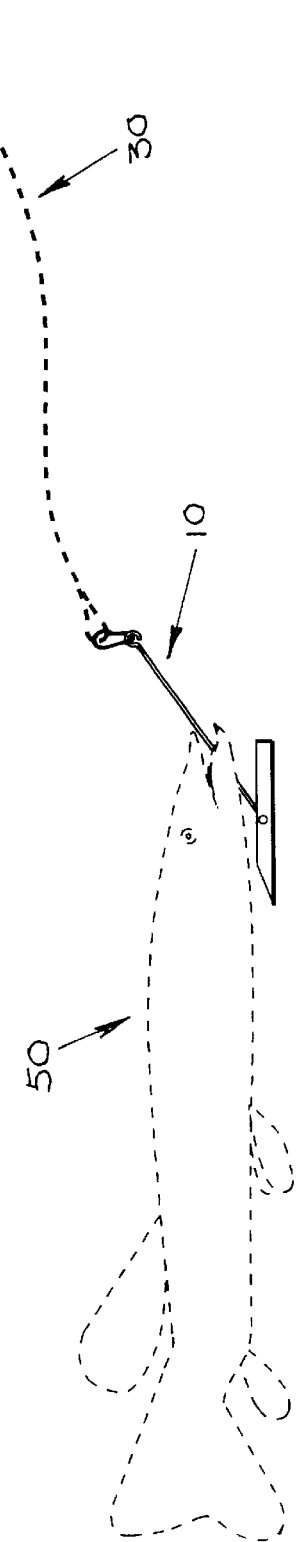

STRINGER USABLE FOR SMALL, MEDIUM AND LARGE FISH

BACKGROUND OF THE INVENTION

Various types of fish stringers which keep caught fish in the water beside the fisherman's boat have been in use prior to recorded history. The purpose of the stringer is to keep the caught fish cool and hopefully alive until time to kill the fish and prepare it to be eaten.

Beginning in the twentieth century a number of U.S. patents have been granted on various types of fish stringers and those patents which relate to this applicant's fish stringer are set forth in the Information Disclosure Statement filed with this application.

SUMMARY OF THE INVENTION

Briefly put, my invention comprises (1) a stringer rope one end of which is secured to the fishing boat and the other end is in the water; (2) a six inch long U shaped channel made of stainless steel; (3) an eight inch long stainless steel wire, each end of the wire being formed into a small ring; (4) a stainless steel pin passing through the ring on the lower end of the stainless steel wire and through small holes near the edges of the channel, the pin secured by a stainless steel rivet on each end of the pin.

The foregoing four components of my invention can be used to securely keep small, medium sized and/or large caught fish cool and hopefully alive until it is desired to kill the fish and prepare it to be eaten.

BRIEF DESCRIPTION OF THE DRAWINGS

FIG. 1 is front elevational view of the mechanism which is clipped onto the stringer.

FIG. 2 is a side elevational view of the mechanism which is clipped onto stringer 30.

FIG. 7 is an assembly showing the U shaped channel having been poked through the jaws of a large sized fish.

FIG. 8 is an assembly showing the U shaped channel having been poked through the lower jaw of the large sized fish.

FIG. 90 is a blown up front view of the U shaped channel 1 sectioned to show how the wire 2 is attached to pin 4.

FIG. 91 is a blown up side view of the U shaped channel 1, wire 2 and pin 4.

FIG. 92 is a blown up view of wire 2 and clip 3.

DETAILED DESCRIPTION OF THE PREFERRED EMBODIMENT

Figure 3:
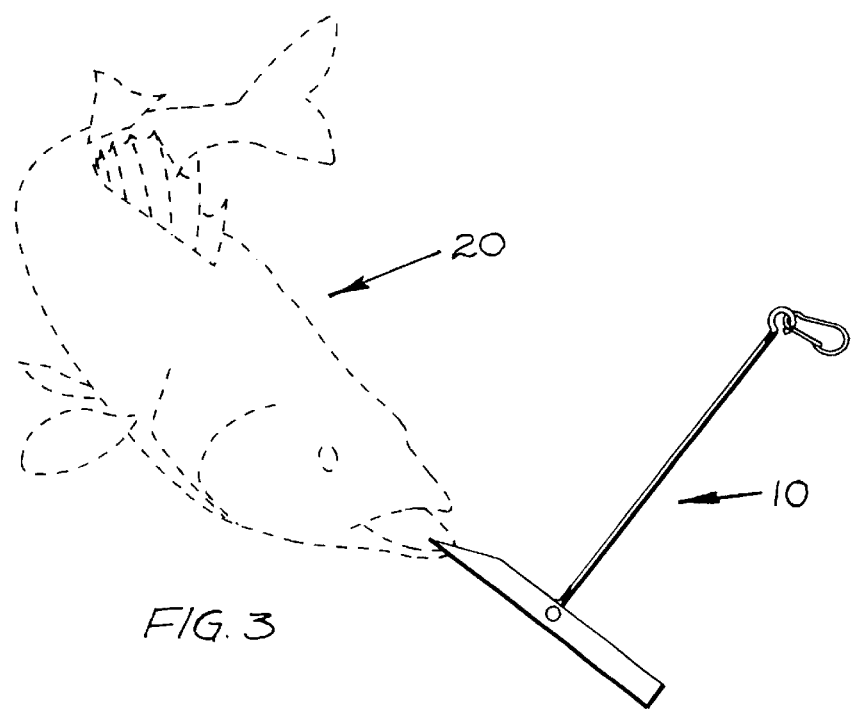
FIG. 3 is an assembly showing the U shaped channel being poked into the mouth of a small fish.
Figure 4:
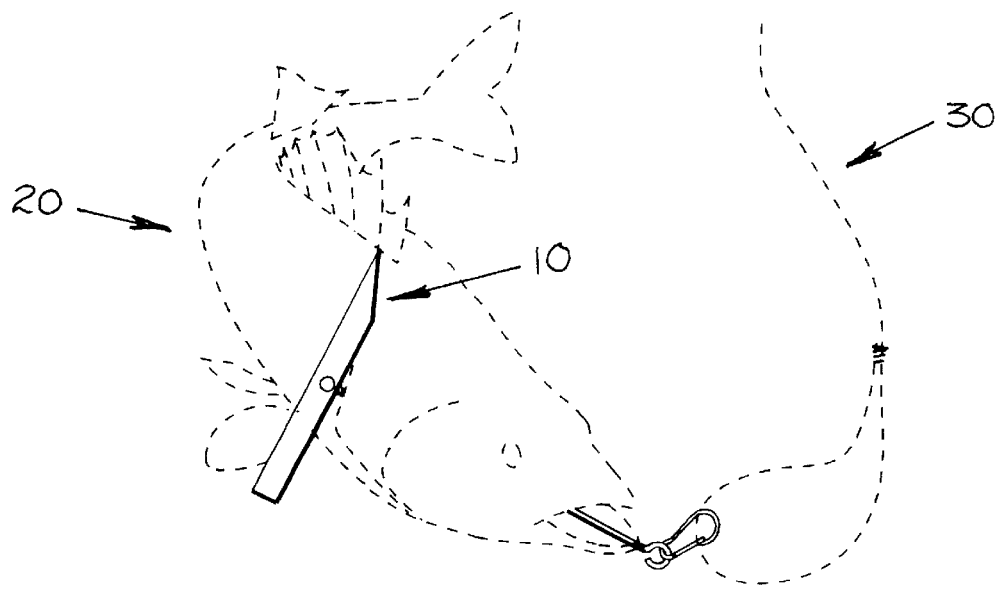
FIG. 4 is an assembly showing the U shaped channel lying against the small fish's gill.
Figure 6:
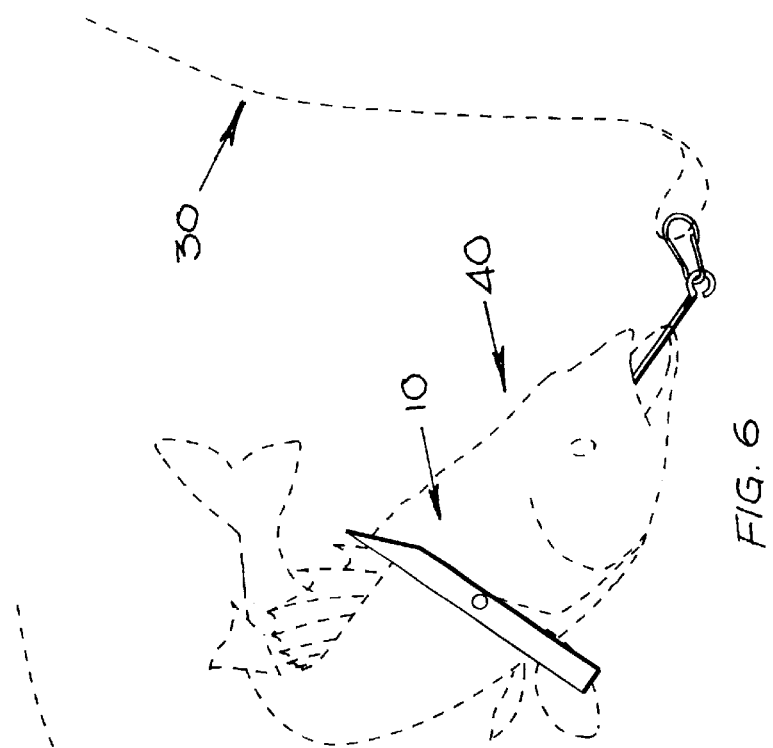
FIG. 6 is an assembly showing the U shaped channel lying against one of the fish's gills.
Figure 5:
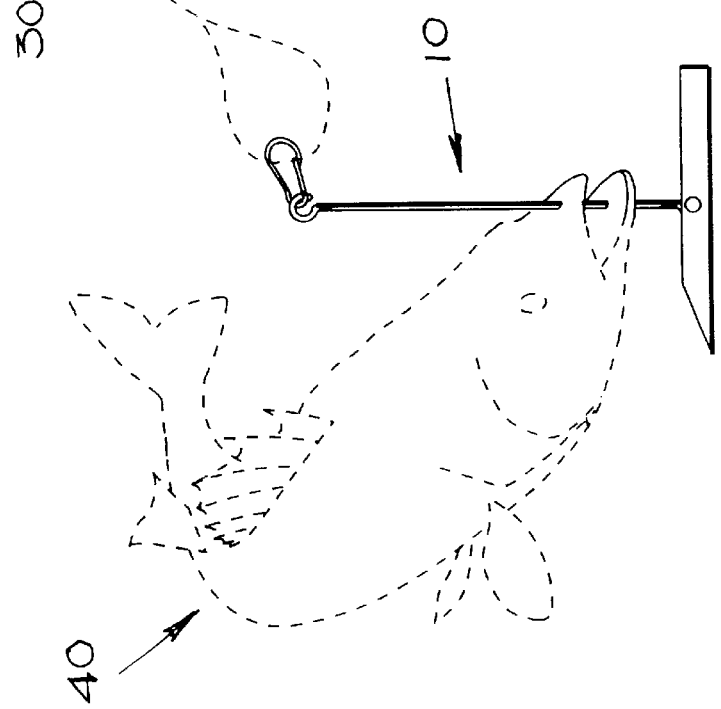
FIG. 5 is an assembly showing the U shaped channel having been poked through the jaws of a medium sized fish.

One end of a stringer 30 preferably made of ⅜ths inch diameter cotton rope is secured to the fishing boat and the stringer tossed over the side of the boat into the water. For each caught fish I fasten a preferably eight inch long stainless steel wire 2 with each end of wire 2 formed into a small ring, using clip 3 passing through the ring on the upper end of wire 2 to attach wire 2 to stringer 30.

The U shaped channel 1 is secured to the small ring on the lower end of wire 2 by a stainless steel pin 4 passing through the ring and through two small holes on opposite edges of U shaped channel 1. The pin is secured in its position by a stainless steel rivet on each end of pin 4.

When a small fish is caught, meaning a fish from five to eight inches long, the fisherman pokes one end of channel 1 into the fish's mouth and through one of the fish's gills and pulls the channel tight against the gill.

When a medium sized fish is caught, meaning a fish from eight to fourteen inches long, the fisherman pokes one end of channel 1 through the lower jaw of the fish and pulls the channel tight against the lower jaw of the fish.

When a fish is over fourteen inches long such as Northern Pike which grow to be over forty inches long, the fisherman pokes one end of channel 1 through the lower jaw of the fish and then pulls the channel tight against the outside of the fish's lower jaw.

The ways of using my invention are not limited to what has heretofore been described. The scope of my invention is limited only by the appended claims.

I claim:

1. An apparatus for keeping a quantity of many different sizes of caught fish cool and alive comprising:

a fish stringer, one end of which is secured to a fisherman's boat and the stringer then tossed overboard;

a stainless steel wire about eight inches long, having upper and lower ends, both ends of which are formed into a small ring;

a U-shaped stainless steel channel;

a stainless steel pin connecting the ring in the lower end of the wire and a middle of the U-shaped channel by two small holes near opposite edges of the U-shaped channel,; and wherein the pin is secured in place by stainless steel rivets on ends of the pin.

2. The apparatus as set forth in claim 1 in which the stringer is made of ⅜ths inch cotton rope and is twelve feet long.

3. The apparatus as set forth in claim 1 in which the U-shaped channel is six inches long.

4. The apparatus as set forth in claim 1 in which the wire is connected to the stringer by a clip which passes through the ring in the upper end of the wire.